United States Patent

[11] 3,600,097

[72] Inventor Lee O. Heflinger
 Torrance, Calif.
[21] Appl. No. 846,463
[22] Filed July 31, 1969
[45] Patented Aug. 17, 1971
[73] Assignee TRW Inc.
 Redondo Beach, Calif.

[54] HOLOGRAMS HAVING INCREASED PHASE SENSITIVITY
 5 Claims, 3 Drawing Figs.

[52] U.S. Cl. .................................................. 356/106,
 350/3.5
[51] Int. Cl. ......................................... G01b 9/02,
 G02b
[50] Field of Search ............................... 356/106;
 350/3.5

[56] References Cited
OTHER REFERENCES

"Holographic Interferometry," Journal of Applied Physics, Heflinger et al., Vol. 37, No. 2, Feb. 1966.

*Primary Examiner*—Ronald L. Wibert
*Assistant Examiner*—Conrad Clark
*Attorneys*—Daniel T. Anderson, Edwin A. Oser and Jerry A. Dinardo

ABSTRACT: A holographic interferogram which permits viewing of the object at higher orders of diffraction for increasing the phase sensitivity. A double exposure holographic technique is used whereby a first hologram is made of the setup without an object and a second hologram is made with the object to be recorded. The two holograms are heavily exposed so that the fringe lines corresponding to minimum light intensity are narrow compared to the fringe spacing. The clear and dark areas of the two holograms are then reversed and combined, for example, by contact printing. This new hologram may now be reconstructed by viewing it in the light diffracted into a predetermined higher order. As a result, the phase sensitivity is multiplied by the order by which the object is viewed.

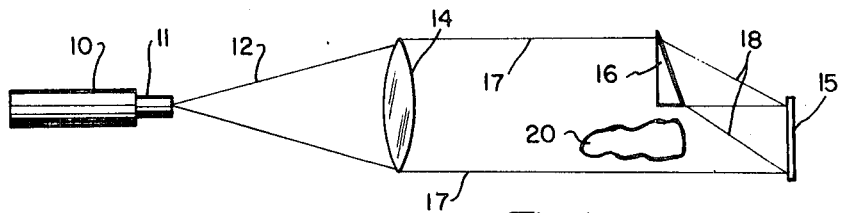
Fig.1
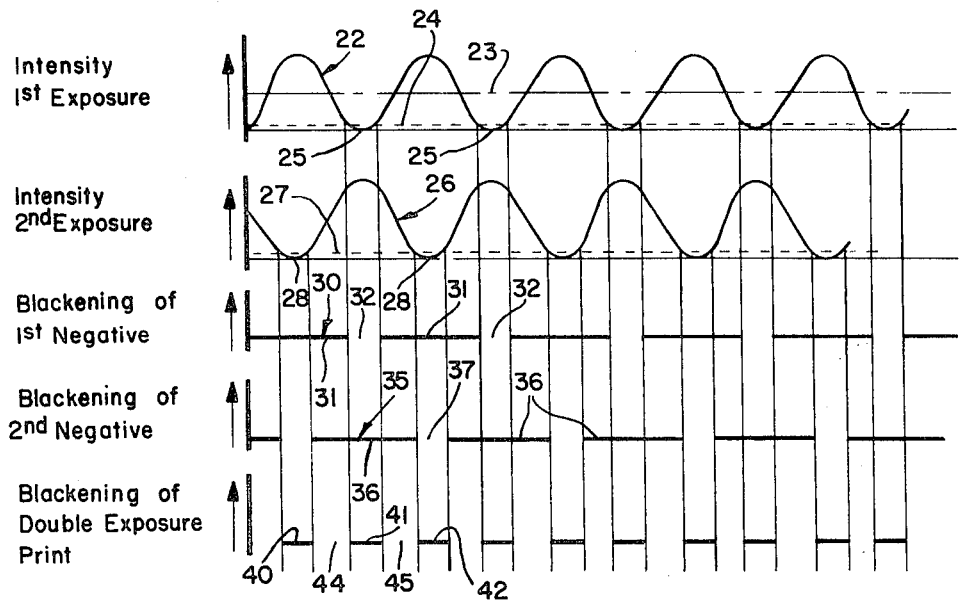
Fig.2 → DISTANCE
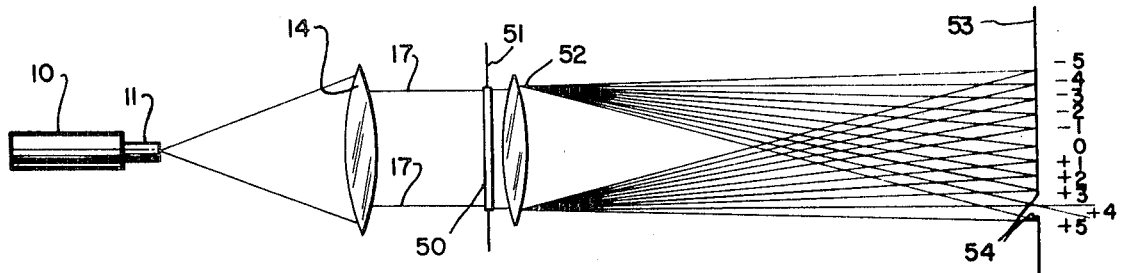
Fig.3
Lee O. Heflinger
INVENTOR
BY

HOLOGRAMS HAVING INCREASED PHASE SENSITIVITY

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates generally to holography, and particularly relates to a process of producing a holographic interferogram having increased phase sensitivity and an apparatus for viewing such an interferogram.

It is well know in classical interferometry that a diffraction grating is capable of diffracting the light into higher orders. The resolution of a spectrum, for example, is a direct function of the order number used. Accordingly it would be highly desirable to make use of holographic interferometry where high orders of diffraction are used for increasing the phase sensitivity. The phase sensitivity can be increased by a factor equal to the order number used. However, although it is quite apparent that light diffracted into the nth order from interferogram has $n$ times the phase variation or $n$ times the phase perturbation produced by an object, it is not quite so simple to diffract the light into an order higher than the first order in such a manner that phase perturbations between the two exposures are multiplied.

Thus one might want to use a stored beam interferometer. In this case, the $n$th order reconstruction might be obtained by interfering the $h$th order output beam with a plane wave which is superimposed on the $n$th order beam. This however, requires a reference beam having a wave front which is flat to a fraction of a light wave. This in turn requires substantially perfect optical elements and substantially perfect alignment within a fraction of a wavelength.

In order to do away with the requirement of optical elements, and alignment of the elements to be perfect within a fraction of a wavelength, double exposure holography may be considered. In this conventional process two exposures are made on the same recording plate to obtain a single hologram. One exposure is made with the subject and the other without. After the recording plate has been thus twice exposed, it is developed and reconstructed. However it is found that the interference pattern observed in second or higher orders of diffraction is the same as that observed in the first order. In other words, this does not yield the desired multiplication of the phase sensitivity of the higher diffraction order.

Still another approach to the utilization of higher orders of diffraction is to make two exposures, one each on a separate recording plate to obtain the results of double exposure holographic interferometry. These two separate plates may then be reconstructed by placing the plates in contact with each other in the reconstruction beam.

However it turns out that additional refinements are necessary before a useful and practical system is obtained.

It is accordingly an object of the invention to provide a method of utilizing holographic interferometry which permits to view the object in high orders of diffraction.

Another object of the invention is to provide apparatus for viewing or reconstructing the object in a predetermined diffraction order of a double exposure holographic interferogram.

A further object of the present invention is to provide a novel technique for measuring low-density aerodynamic flow or generally any aerodynamic phenomena taking place in gases at low pressures.

SUMMARY OF THE INVENTION

A process in accordance with the present invention produces a holographic interferogram which has increased phase sensitivity. In other words, the phase perturbations produced by the object to be recorded can be increased to a considerable extent. This process comprises the steps of initially generating a reference and a scene beam, preferably from a laser source or from the same monochromatic light source. The scene and reference beams are caused to impinge on a first photosensitive recording material to generate a first hologram.

It is one of the features of the present invention that this recording material is exposed heavily. This means that fringe lines are generated which correspond to a minimum of light intensity, these fringe lines being narrow compared to the fringe spacing. This point is important as will subsequently be shown.

Thereafter the same process is repeated with an object to be recorded interposed into the scene beam. Thus a second hologram is made which is again heavily exposed. Then light and dark portions of the first two holograms are reversed and combined. The combined hologram may be recorded on a third photosensitive material to obtain a double exposed hologram. This hologram is reconstructed by means of monochromatic light. The object is now viewed with the light diffracted into a predetermined order larger than the first order. Accordingly the phase sensitivity is multiplied by the order in which the object is viewed.

Unless the fringe lines of the first two holograms are quire narrow compared to the spacing of the interference fringes, it generally is not possible to view separately the fringe lines from each of the two holograms which have been reversed. If the fringe lines are relatively wide, the hologram is exposed longer than the other. In other words, unless the exposures of the hologram are precisely equal, it is practically impossible to view the fringe lines unless the fringe lines are very narrow or fine. Thus, if the fringe lines are fine, the exposure time of the two holograms is not critical any more.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a schematic representation of a conventional holographic system for taking holograms in accordance with the process of the present invention;

FIG. 2 is a series of diagrams to explain the narrow fringes created on two separate holograms and their appearance in a reversed reproduction for practicing the process of the present invention; and FIG. 3 is a schematic representation of apparatus in accordance with the present invention for viewing a holographic interferogram made by the process of the present invention.

DESCRIPTION OF THE PREFERRED EMBODIMENT

Referring now to the drawings and particularly to FIG. 1, there is illustrated a conventional holographic arrangement for practicing the method of the present invention. There is provided a source 10 of substantially monochromatic light. Preferably this is a laser as shown, but may consist of another light source, such as mercury discharge lamp utilizing a single mercury isotope for generating substantially monochromatic light. There is also provided a lens system 11 for diverging the laser beam as shown at 12. This may, for example, consist of any conventional diverging lens or it may be a microscope objective. The diverged beam 12 is then collimated by another lens 14 and is directed toward a recording material 15 for recording the light impinging thereon. Such a photosensitive recording material 15 may consist, for example, of a photographic film or plate, of a photochromic material or any other suitable photosensitive material. The collimating lens 14 may be a double convex lens as shown.

In order to provide a reference beam here may be provided a prism or wedge 16 extending over substantially one-half of the area of the collimated light beam 17. The purpose of the prism 16 is to deflect the light beam to create a reference beam 18, which substantially covers the entire surface of the recording material 15. An object 20 to be recorded may be disposed in the lower portion of the collimated light beam or scene beam so that a hologram of the object 20 may be taken. The arrangement of FIG. 1 guarantees that the scene beam and the reference beam are of substantially equal intensity at the recording material 15.

The holographic arrangement of FIG. 1 is conventional. One of its purposes is to generate a reference beam 18, making a very small angle with a subject beam 17. Thus, in general, the angle between the two beams should be smaller than 10°. Preferably, however, the angle between the subject and reference beams is between 1° and 2° and may be even smaller than 1°. The reason for this arrangement is that a small angle between reference and subject beams creates relatively large interference fringes on the hologram. This is desirable for the purpose of the present invention, as will be more fully explained hereinafter. Instead of utilizing a prism 16 for generating the reference beam 18, it is also feasible to use other conventional interferometric arrangements. Among those may be mentioned the Michelson interferometer or the Mach-Zehnder interferometer.

The manner in which a holographic interferogram is generated is accordance with the present invention will now be explained. Initially a first hologram or a first recording material is produced without a subject 20. This hologram should be heavily exposed so that the interference fringe lines are narrow compared to the interference fringe spacing. The fringe lines are the lines obtained where there is cancellation of the light beams or a minimum of light intensity. In other words, there is substantially an absence of light. This will be more fully explained hereinafter.

After the first hologram has been obtained in this manner the object 20 is introduced into the scene beam 17 and a second hologram is made on a second recording material. This hologram is also heavily exposed.

Subsequently the clear and opaque portions of the two holograms are reversed and combined to provide a new hologram. This may, for example, be effected by making a contact print on a third recording material.

The final hologram, that is, the hologram made on the third recording material, may now be inspected in a higher diffraction order. This, of course, permits to multiply the phase sensitivity by the order number in which the image is viewed.

The significance of relatively thin fringe lines, that is, fringe lines which are a small fraction of the fringe spacing will now be explained by reference to FIG. 2. Thus the wave 22 of FIG. 2 indicates generally the intensity of a light beam recorded on the first recording material. Thus if a recording material such as a photographic plate is exposed in a normal manner, all the waves above a dotted line 23 corresponding to the exposure threshold will appear dark or black, and those below the dotted line will appear light or clear. It will readily be seen that, in that case, the fringe lines are about as wide as the spacing between adjacent fringes. Therefore, in accordance with the present invention the plate is heavily exposed and the exposure threshold is shown by the dotted line 24, which should be very close to the zero line. It will now be seen that only a narrow portion of the lower peaks of the wave 22, that is, the portions 25, appear clear. Therefore, by exposing the plate very heavily, the width of these wave portions 25 resulting in the fringe lines can be made very narrow.

The wave 26 similarly indicates another light wave recorded by the second recording material while the object 20 is present. The waves 22 and 26 have the same frequency or wavelength, but have different phases, the phase difference arising from the presence of the object. Accordingly, as shown in FIG. 2, the two waves 22 and 26 are not in phase. Again, the second recording material is heavily exposed, as indicated by the dotted line 27 showing the exposure threshold. As a result, only the low peaks 28 result in clear fringe lines.

A picture of a portion of the first negative or the first recording material is schematically shown at 30. It will be noted that there are alternate black portions 31 and light portions 32, the latter corresponding to the lower wave portions 25 of the wave 22. Similarly, for the second recording material made with the object 20 in place, there is obtained a negative 35 having alternate black portions 36 and light portions 37. The light portions correspond to the lower wave peaks 28.

When these two negatives are combined and reversed, say by a contact print or in any other way, the portions 32 and 37 which were previously clear now become dark as indicated at 40, 41, 42 etc. On the other hand, the portions 44, 45 etc. are light or clear. These correspond to the previously dark portions, such as 31 or 36, which do not register with one of the clear portions, such as 32 or 37.

It will now be apparent why it is important to have narrow fringe lines. In the first place, this will create a minimum of undesirable interaction between two sets of fringe lines from the two holograms. Furthermore, it is well known that narrow lines diffract light more uniformly into higher orders than broad lines. Thus the narrower the lines are the less there is a chance of overlap of the fringe lines of the different holograms. It should also be noted that since the two original waves 22 and 26 are not in phase, the fringe lines, such as 32 and 37 change relative distances in accordance with the difference of the phases. It will also be obvious that what is needed is not only a narrow fringe line, but one with a clean edge.

This depends in part on the gamma of the film. This has to do with the contrast of the film and should ideally be infinity. Of course, as a practical matter, there is no emulsion with an infinite gamma. However, it is recommended to use an emulsion such as Kodak 649 F emulsion or Kodak Kodalith Pan emulsion. These are emulsions with high contrast and great resolution.

It will be evident by inspection of FIG. 2 that the final hologram is in the nature of an optical grating with a number of very fine lines. More specifically, there are actually two sets of fine lines, one from each hologram. Accordingly, apparatus is now needed for viewing a higher order of these interference or diffraction lines. This may be done with the apparatus of FIG. 3, which may again consist of a laser 10 having a diverging lens 11, followed by a collimating lens 14. Accordingly a collimated laser beam 17 may illuminate a previously recorded hologram 50. The hologram 50 may conveniently be arranged in a plate 51 to block off additional laser light because the hologram 50 will essentially cover only one-half of the width of the beam.

The light emerging from the hologram 50 may now be focused by focusing lens 52 on an aperture plate 53 having a suitable opening 54. The opening 54 is of such size as to pass a desired diffraction order therethrough. Thus, as shown, there may be five orders, the aperture 54 being so positioned as to pass the fourth order therethrough. This, of course, will multiply the phase sensitivity by the factor four. However, it will be understood that higher orders may be selected at will.

The holographic interferogram of the invention may be used with advantage for measuring low density aerodynamic flow. Some applications, for example, are the determination of aerodynamic flow about an airplane model at low pressure corresponding to the upper atmosphere. The technique is particularly useful for holography of objects in transmission.

As indicated before, the angle between the reference beam and the scene beam at the recording material should preferably be small. This will cause the creation of interference fringes which are rather coarse. As a result, the fringe lines can be made a smaller fraction of the distance between adjacent fringes, than if the angle were larger. An additional result is that due to the coarseness of the interference fringes, it is not necessary to utilize a recording material with the highest possible resolution, so that the film sensitivity is increased.

There has thus been disclosed a method of producing a holographic interferogram and an apparatus for viewing such an interferogram. The process of the invention permits to observe the light diffracted into a higher order with a resulting increase in phase sensitivity. This technique is particularly useful for measurement of aerodynamic flow at low pressures. Thus the method of the present invention permits to obtain increased sensitivity beyond that obtainable with conventional interferometry. On the other hand, due to the fact that holography is used for method of the invention, there is freedom from the requirement of convention optics and conventional interferometry of requiring substantially perfect optical components.

What I claim is:

1. A process for producing a holographic interferogram having increased phase sensitivity comprising the steps of:
   a. generating a reference beam and a scene beam from the same, substantially monochromatic light source;
   b. causing the scene beam and the reference beam to impinge on a first photosensitive recording material to generate a first hologram and exposing the first recording material heavily whereby fringe lines corresponding substantially to the absence of light are created on the first recording material the fringe lines being narrow compared to the fringe spacing;
   c. interposing an object to be recorded into the scene beam and recording on a second photosensitive recording material a second hologram and again heavily exposing the second hologram;
   d. reversing light and dark areas on the first and second recording material and combining the reversed first and second recording materials to obtain a double exposed hologram;
   e. reconstructing the double exposed hologram by means of substantially monochromatic light; and
   f. viewing the object with the light diffracted into a predetermined order larger than the first order, whereby the phase sensitivity is multiplied by the order in which the object is viewed.

2. A process as defined in claim 1 wherein the angle between the reference beam and the scene beam when impinging on the first and second recording material is no more than 10°.

3. A process as defined in claim 1 wherein the first and second recording material consists each of a high-contrast photographic plate.

4. A process as defined in claim 3 wherein the double exposed hologram is made on a third recording material by a contact printing from the two high-contrast photographic plates.

5. A process as defined in claim 1 wherein the scene beam and the reference beam are of substantially equal intensity at the recording material.

UNITED STATES PATENT OFFICE
CERTIFICATE OF CORRECTION

Patent No. 3,600,097      Dated      August 17, 1971

Inventor(s)      Lee O. Heflinger

It is certified that error appears in the above-identified patent and that said Letters Patent are hereby corrected as shown below:

Column 2, line 24, "quire" should read -- quite --; line 28, after "hologram" insert -- becomes very amplitude-sensitive, particularly if one hologram --.

Signed and sealed this 4th day of April 1972.

(SEAL)
Attest:

EDWARD M. FLETCHER, JR.         ROBERT GOTTSCHALK
Attesting Officer               Commissioner of Patents